R. M. COOCH.
Hemp Harvester.
No. 2,179. Patented July 16, 1841.
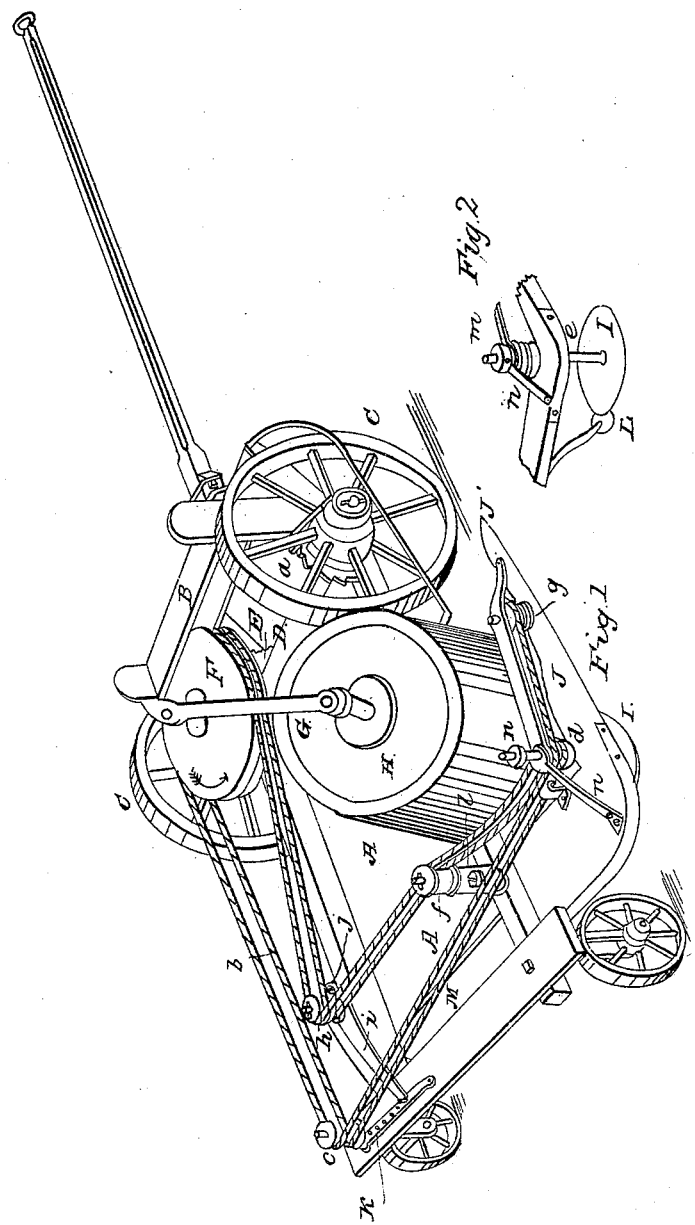

UNITED STATES PATENT OFFICE.

RICHARD M. COOCH, OF LAMBERTSVILLE, NEW JERSEY.

IMPROVEMENT IN MACHINES FOR CUTTING AND GATHERING FLAX, HEMP, &c.

Specification forming part of Letters Patent No. 2,179, dated July 16, 1841.

*To all whom it may concern:*

Be it known that I, RICHARD M. COOCH, of Lambertsville, in the county of Hunterdon and State of New Jersey, have invented an improved machine for the purpose of cutting flax and hemp and of gathering and depositing the same; and I do hereby declare that the following is a full and exact description thereof.

This machine is in its general construction like that for which a patent was granted to William Britton and John Silvers on the 25th day of November, 1838; but it differs essentially from said machine in its being made to cut the flax or hemp close to the ground, instead of being a "machine for pulling flax or hemp."

In the accompanying drawings, A A are the bed or bottom of the carriage, upon which the plants are to be deposited after they have been cut by the revolving knife, to be presently described. The carriage is to be drawn by one or more horses, which may be driven by a person occupying the seat B. The two fore wheels, C C, of the carriage serve by their friction upon the ground to give motion to the parts of the machine concerned in cutting and depositing the flax or hemp, the axle D revolving with them when the machine is drawn forward. They are not, however, permanently attached to the axle, but have each a ratchet-wheel, $a$, on the inner end of its hub, furnished with a pawl by which the axle is made to turn with the wheel in advancing, but allowing the wheel to turn upon the axle when the motion of the wheel is reversed. On the axle D there is firmly keyed a bevel or miter wheel, E, which meshes into a corresponding miter-wheel on the under side of the band-wheel or whirl F, the axis of which turns at its lower end in a bearing attached to the frame of the carriage and its upper end in the brace-piece G. Two endless bands, $b\ b$, pass in part around the whirl F, the guide and cutter rollers, and the drum H. These bands extend from the wheel F to the guide-rollers $c$, thence to the guide and cutter roller $d$, which roller is made to revolve with its axis $e$. This axis at its lower end carries a revolving circular knife or cutter, I. (Shown more distinctly in Figure 2.) To insure the motion of the cutter, one of the bands $b$ is carried around it, so as to lead back from it to the guide-roller $f$, embracing in its passage back a portion of the periphery of the drum H. The other band is carried forward to the guide-roller $g$, and, after passing around it, extends back to the guide-roller $f$, embracing in its passage a part of the periphery of the drum H. The two bands then pass onto the guide-roller $h$, and thence around the whirl F. To tighten these bands the roller $h$ is fixed upon a metallic arm, $i$, having a fulcrum at $j$, and held at its outer end by a pin passing through holes in the strip $k$. The roller $f$, I place upon an arm, $l$, having a tightening-screw, by which the bands $b\ b$ may be made to embrace a greater or a less portion of the periphery of the drum H. This drum is placed in an inclined position, as represented in the drawings, for the purpose of causing it to raise the plants up as they are cut and to deliver them on the bed A A. The upper gudgeon of this drum runs in the brace-piece G, its lower end in a step attached to the carriage.

J J' is a gathering piece or arm, pointed at its fore end, J', and between this and the guard-rod K K there is a space of from twelve to twenty inches, or such space as shall embrace as great a width of the row of plants as it may be found eligible for the knife to cut and the drum and bands to deliver.

In Fig. 2 the circular revolving knife and its appendages are shown more distinctly than they could be in Fig. 1. The shaft $e$, upon which the knife I is affixed, is capable of sliding up through the roller $d$, so as to raise it from the ground when not in action, and it is represented as so raised up in Fig. 1. When raised up a pin or feather on the axis, which enters a groove in the opening through the roller $d$, and which, when in place, causes the two to turn together, is freed from said roller. When down the collet $m$, which is fastened to the shaft by a set-screw, rests on the piece of metal $n$, and thus determines the distance to which the knife shall descend.

L is a thin grindstone or other sharpening article, upon the face of which the edge of the revolving knife may bear. By this provision and by allowing a small stream of water to run upon the edge of the knife while it is in action it will be kept sharp and preserved from becoming gummed on its cutting-edge. The sharpener L should be allowed to revolve on its axis. If it is desired to deposit the plants upon the ground, instead of retaining them upon the bed A A of the carriage, they may be delivered from the drum and bands onto an endless revolving apron placed above said bed and moved by rollers in the ordinary way. In this case an opening is left at M in the rear end of the bed, through which the plants may be delivered onto the ground.

Having thus fully described the nature of my machine and shown how the same operates, what I claim as constituting my invention, and desire to secure by Letters Patent, is—

The combining of the revolving knife I with the drum, the gathering-piece, and the endless bands, as herein described, so as to convert the said machine from one for pulling flax and hemp into one for cutting and delivering the same, the whole being constructed and operating substantially as herein set forth.

RICHARD M. COOCH.

Witnesses:
    THOS. P. JONES,
    D. J. BISHOP.